June 24, 1958  F. R. McFARLAND ET AL  2,840,386
FRONT SUSPENSION STEERING KNUCKLE WITH ELASTIC MEANS
Filed Aug. 22, 1956

INVENTOR
Forest R. McFarland, Paul P. Thomas
BY
Redrow & Easton

United States Patent Office 2,840,386
Patented June 24, 1958

2,840,386
FRONT SUSPENSION STEERING KNUCKLE WITH ELASTIC MEANS

Forest R. McFarland, Huntington Woods, and Paul P. Thomas, Detroit, Mich., assignors to Studebaker-Packard Corporation, Detroit, Mich., a corporation of Michigan Application August 22, 1956, Serial No. 605,514

9 Claims. (Cl. 280—96.2)

This invention relates to a new and improved steering knuckle assembly for vehicles.

The steering knuckle assembly of the present invention is illustrated herein in connection with a double wishbone type of front wheel suspension although the invention may also be utilized with other types of suspensions.

In a double wishbone type of front wheel suspension the spring means associated therewith resiliently resists vertical upward movement of the front wheel. The forces normally imparted from a wheel to its wheel carrying structure when the wheel encounters irregularities in the road such as bumps and holes have both vertical and horizontal components, however. The double wishbone type of suspension therefore satisfactorily functions to resiliently resist and absorb the vertical force components but the horizontal force components are transmitted unabated through the suspension structure from the wheel to the frame of the vehicle.

The steering mechanism associated with a double wishbone type of suspension and other suspensions is sensitive to the forces transmitted from the wheel to the suspension structure. In the case of the double wishbone type of suspension the vertical force components are resiliently resisted satisfactorily and the steering mechanism is not adversely affected by these force components. In the case where the suspension structure does not provide for resiliently resisting the horizontal force components, however, the steering mechanism is subjected to the direct effect of the horizontal force components which are transmitted from the wheel to the frame of the vehicle through the suspension structure. These force components are not regular in nature and the effect is that sharp and erratic forces are transmitted to the steering gear which invokes roughness instead of smoothness in the steering operation.

It is a main object of the present invention to provide a new and improved steering knuckle assembly which provides for the resilient resistance of all forces transmitted to the steering mechanism and frame of the vehicle from the wheel associated with the steering knuckle assembly.

Other objects of the invention will become apparent from the following specification, the drawing relating thereto, and the appended claims.

Figure 1:
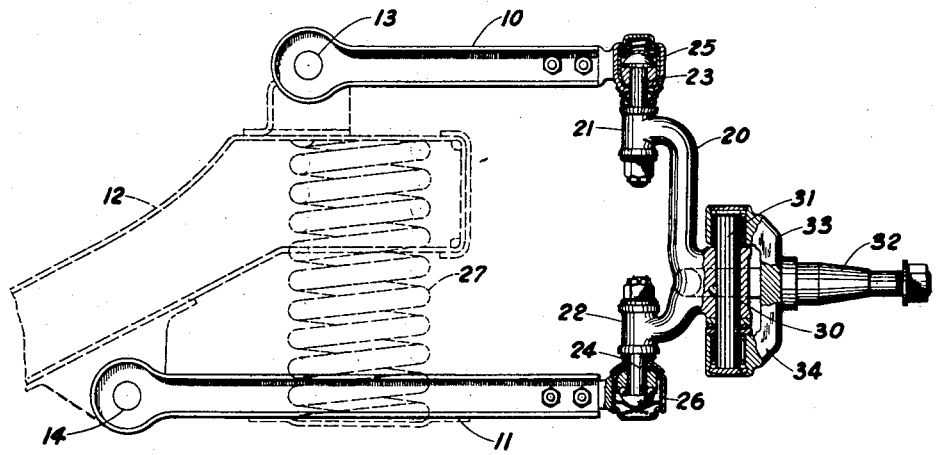
Fig. 1 shows an elevation view of a double wishbone type independent suspension which embodies the steering knuckle of the present invention.
Figure 2:
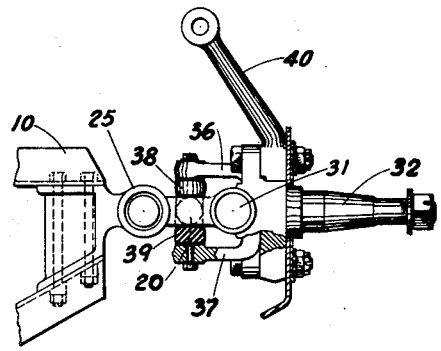
Fig. 2 is a top plan view of the resilient steering knuckle assembly.

The suspension structure includes lever arm means illustrated herein as upper and lower lever arms 10 and 11. Upper lever arm 10 is connected at its inner end to a vehicle frame 12 with a pivotal connection 13 and lower lever arm 11, which is somewhat longer than the upper arm, is connected at its inner end to the frame 12 with a pivotal connection 14.

The pivotal connections 13 and 14 are about horizontal axes and are in vertically spaced arrangement with the upper pivotal connection 13 being positioned closer to the wheel of the vehicle. Wheel support means are illustrated herein which includes a strut portion 20 which is operably connected by universal joint means at the opposite ends thereof to the outer ends of the upper and lower lever arms 10 and 11. Strut 20 has aligned tubular portions 21 and 22 at the opposite ends thereof. Shafts 23 and 24 are provided which are fixedly attached to tubular portions 21 and 22 and are respectively connected to the outer ends of lever arms 10 and 11 by means of universal type joints 25 and 26. Regarding the scope of the invention, the joints 25 and 26 could be pivotal connections having axes parallel to pivotal connections 13 and 14 if the shafts 23 and 24 were journaled with respect to strut 20, instead of being fixedly attached thereto, so that strut 20 would have pivotal movement about an axis which extends through shafts 23 and 24. Functionally, it is only necessary that structure be provided so that strut 20 is permitted to have pivotal movement about a vertical axis and that pivotal movement of each of the lever arms 10 and 11 in a vertical plane is permitted relative to the strut 20.

Although lever arms 10 and 11 are each illustrated as having the conventional wishbone construction, such construction is not essential to the invention. Similarly, although universal joints 13 and 14 are each illustrated as having a ball and socket type construction, any type of connection between strut 20 and lever arms 10 and 11 which provides for universal or swiveling movement of the strut 20 relative to lever arms 10 and 11 respectively may be utilized within the scope of the invention.

The vertical movement of lever arms 10 and 11 relative to frame 12 are resiliently resisted by a helical coil spring 27. Spring 27 is illustrated as being disposed between the lower lever arm 11 and underside of frame 12. Other forms and positions for the resilient means would also be satisfactory so long as the resilient means functions to resiliently resist vertical movement of lever arms 10 and 11 relative to frame 12.

Strut 20 is provided with a laterally extending tubular portion 30 in which a stub shaft 31 is fixedly mounted. The opening in tubular portion 30 is formed so that shaft 31 extends in a generally vertical direction and is spaced outwardly from strut 20.

An axle member 32 is provided upon which a wheel (not shown) may be mounted. Axle member 32 has two arms 33 and 34 pivotally connected to the opposite ends of shaft 31 to provide for pivotal movement of axle member 32 in a horizontal plane about the axis of shaft 31 and relative to strut 20.

Axle member 32 is also provided with forked arms 36 and 37 which straddle stub shaft 31 and are in spaced relation to strut 20. Resilient means, which are illustrated herein as rubber pads 38 and 39, are disposed between strut 20 and the forked arms 36 and 37 to resiliently resist pivotal movement of axle member 32 in a horizontal plane relative to the strut 20. As illustrated herein rubber pads 38 and 39 are fixedly attached to forked arms 36 and 37 respectively and in abutting engagement with strut 20 although other operative arrangements could be provided.

A steering knuckle arm 40 is attached to axle member 32 and, in the steering operation, movement of arm 40 effects pivotal movement of axle member 32 and strut 20 as a unit about a vertical axis extending through universal joints 25 and 26.

With the above described construction, vertical force components transmitted to axle member 32 from a wheel mounted thereon are resiliently resisted in the conventional manner by spring 27. The vertical force components are transmitted directly through strut 20 to cause pivotal movement of lever arms 10 and 11 about their horizontal axes and this pivotal movement is resiliently resisted by spring 27.

In accordance with the invention, the horizontal force components transmitted to axle member 32 cause pivotal movement of axle member 32 in a horizontal plane about the axis of shaft 31 and relative to strut 20. This pivotal movement of axle member 32 is resiliently resisted by rubber bushings 38 and 39 and, as a result, the steering arm 40 is not subjected to the direct effects of the horizontal force components and consequently sharp and erratic forces are not transmitted to the steering gear. The resilient connection between axle 32 and strut 20 does not interfere with the steering of a wheel mounted on axle, however because the actual relative pivotal movement between axle 32 and strut 20 will be relatively small, on the order of only a few degrees for example.

The invention may be embodied in other specific forms without departing from the spirit or essential characteristics thereof. The present embodiment of the invention is therefore to be considered in all respects as illustrative and not restrictive, the scope of the invention being indicated by the appended claims rather than by the foregoing description, and all changes which come within the meaning and range of equivalency of the claims are therefore intended to be embraced therein.

It is claimed and desired to secure by Letters Patent:

1. A steering knuckle assembly for a vehicle having a frame comprising wheel support means operably connected to said frame for pivotal movement relative to said frame about a first generally vertically extending axis, an axle member operably connected to said support means and mounted for pivotal movement relative to said support means about a second generally vertically extending axis, and resilient means disposed between said axle member and said support means for resiliently resisting pivotal movement of said axle member relative to said support means.

2. A steering knuckle assembly for a vehicle having a frame comprising wheel support means having the opposite ends thereof operably connected to said frame for pivotal movement about a first generally vertically extending axis, an axle member operably connected to said support means and mounted for pivotal movement about a second generally vertically extending axis, and resilient means disposed between said axle member and said support means for resiliently resisting pivotal movement of said axle member relative to said support means.

3. A steering knuckle assembly for a vehicle having a frame comprising lever arm means including upper and lower lever arms pivotally connected at their inner ends to said frame about vertically spaced horizontal axes, wheel support means operably connected at the opposite ends thereof to the outer ends of said lever arms for pivotal movement about a first generally vertically extending axis, an axle member operably connected to said support means and mounted for pivotal movement about a second generally vertically extending axis, and resilient means disposed between said axle member and said support means for resiliently resisting pivotal movement of said axle member relative to said support means.

4. A steering knuckle assembly for a vehicle having a frame comprising lever arm means including upper and lower lever arms pivotally connected at their inner ends to said frame about vertically spaced horizontal axes, wheel support means operably connected by universal joint means at the opposite ends thereof to the outer ends of said lever arms for pivotal movement about a first generally vertically extending axis, an axle member operably connected to said support means and mounted for pivotal movement about a second generally vertically extending axis, and resilient means disposed between said axle member and said support means for resiliently resisting pivotal movement of said axle member relative to said support means.

5. A steering knuckle assembly for a vehicle having a frame comprising wheel support means including a strut portion operably connected to said frame for pivotal movement about a generally vertically extending axis, a shaft attached to said wheel support means and extending in a generally vertical direction and spaced outwardly from said strut portion, an axle member having arms pivotally connected to said shaft at opposite ends of said shaft and having forked arms straddling said shaft and said strut portion, and resilient means disposed between said forked arms and said strut member for resiliently resisting pivotal movement of said axle member relative to said wheel support means.

6. A steering knuckle assembly for a vehicle having a frame comprising wheel support means including a strut portion operably connected to said frame for pivotal movement about a first generally vertically extending axis, an axle member operably connected to said strut portion for pivotal movement relative to said strut member about a second generally vertically extending axis, said axle member having arm portions straddling said strut portion, and resilient means disposed between said arm portions and said strut member for resiliently resisting pivotal movement of said axle member relative to said wheel support means.

7. A steering knuckle assembly for a vehicle having a frame comprising lever arm means including upper and lower lever arms pivotally connected at their inner ends to said frame about vertically spaced horizontal axes, wheel support means including a strut portion operably connected at the opposite ends thereof to the outer ends of said upper and lower lever arms for pivotal movement about a first generally vertically extending axis, an axle member operably connected to said strut portion for pivotal movement relative to said strut member about a second generally vertically extending axis, said axle member having arm portions straddling said strut portion, and resilient means disposed between said arm portions and said strut member for resiliently resisting pivotal movement of said axle member relative to said wheel support means.

8. A steering knuckle assembly for a vehicle having a frame comprising lever arm means including upper and lower lever arms pivotally connected at their inner ends to said frame about vertically spaced horizontal axes, wheel support means including a strut portion operably connected by universal joint means at the opposite ends thereof to the outer ends of said upper and lower lever arms for pivotal movement about a generally vertically extending axis, a shaft attached to said wheel support means extending in a generally vertical direction and spaced outwardly from said strut portion, an axle member having arms pivotally connected to said shaft at opposite ends of said shaft and having forked arms straddling said shaft and said strut portion, and resilient means disposed between said forked arms and said strut member for resiliently resisting pivotal movement of said axle member relative to said wheel support means.

9. A steering knuckle assembly for a vehicle having a frame comprising lever arm means including upper and lower lever arms pivotally connected at their inner ends to said frame about vertically spaced horizontal axes, wheel support means including a strut portion operably connected by universal joint means at the opposite ends thereof to the outer ends of said upper and lower lever arms for pivotal movement about a generally vertically extending axis, a shaft attached to said wheel support means extending in a generally vertical direction and spaced outwardly from said strut portion, an axle member having arms pivotally connected to said shaft at opposite ends of said shaft and having forked arms straddling said shaft and said strut portion, and two rubber pads disposed between said forked arms and in straddling relation to said strut member for resiliently resisting pivotal movement of said axle member relative to said wheel support means.

References Cited in the file of this patent

UNITED STATES PATENTS

| | | |
|---|---|---|
| 1,781,705 | Roos | Nov. 18, 1930 |
| 2,070,289 | Marmon et al. | Feb. 9, 1937 |
| 2,507,108 | Lange | May 9, 1950 |
| 2,577,760 | Hickman | Dec. 11, 1951 |
| 2,631,044 | Booth | Mar. 10, 1953 |